INVENTOR.
JOHN R. McGUIRE
LOUIS C. HARMS

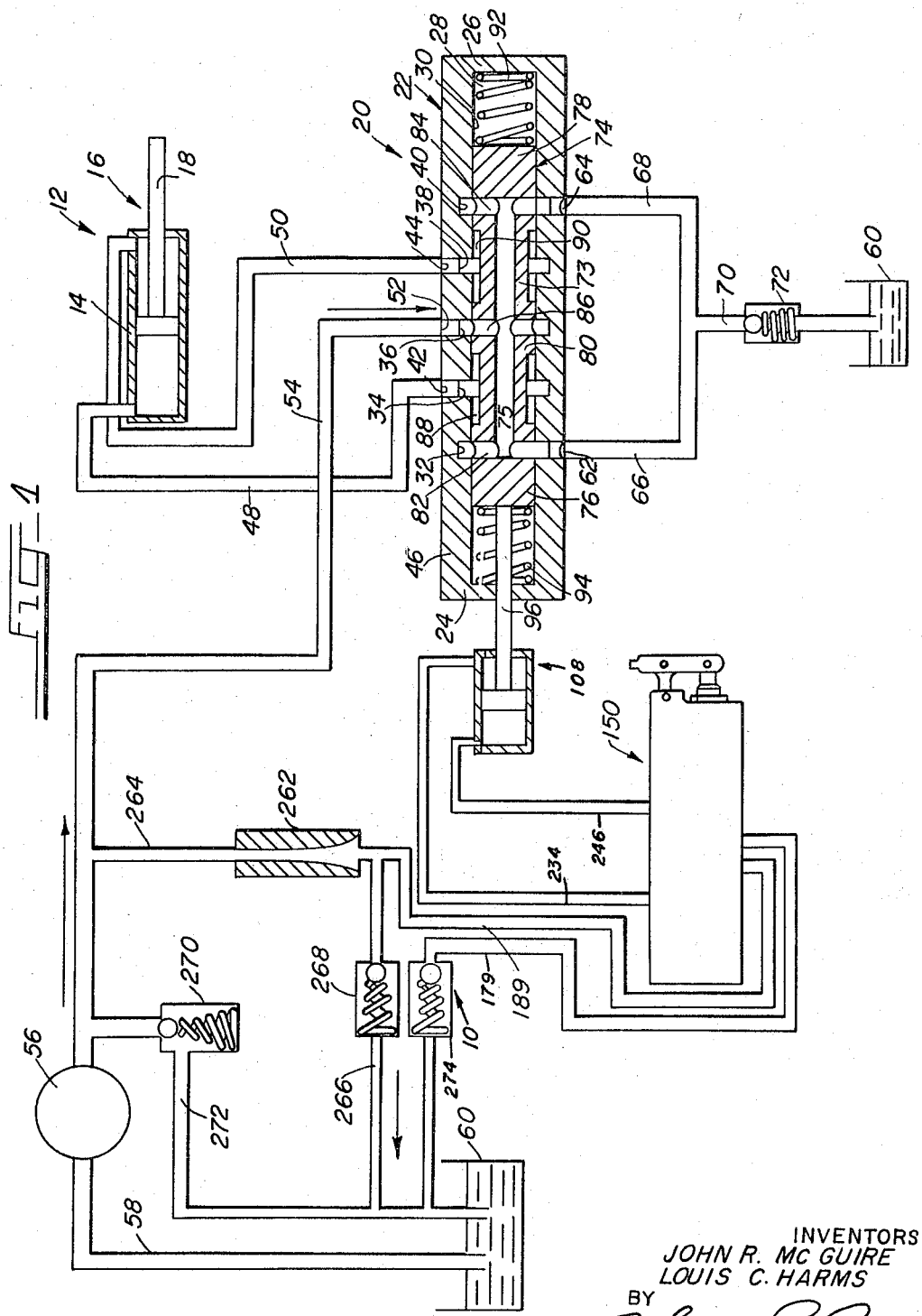

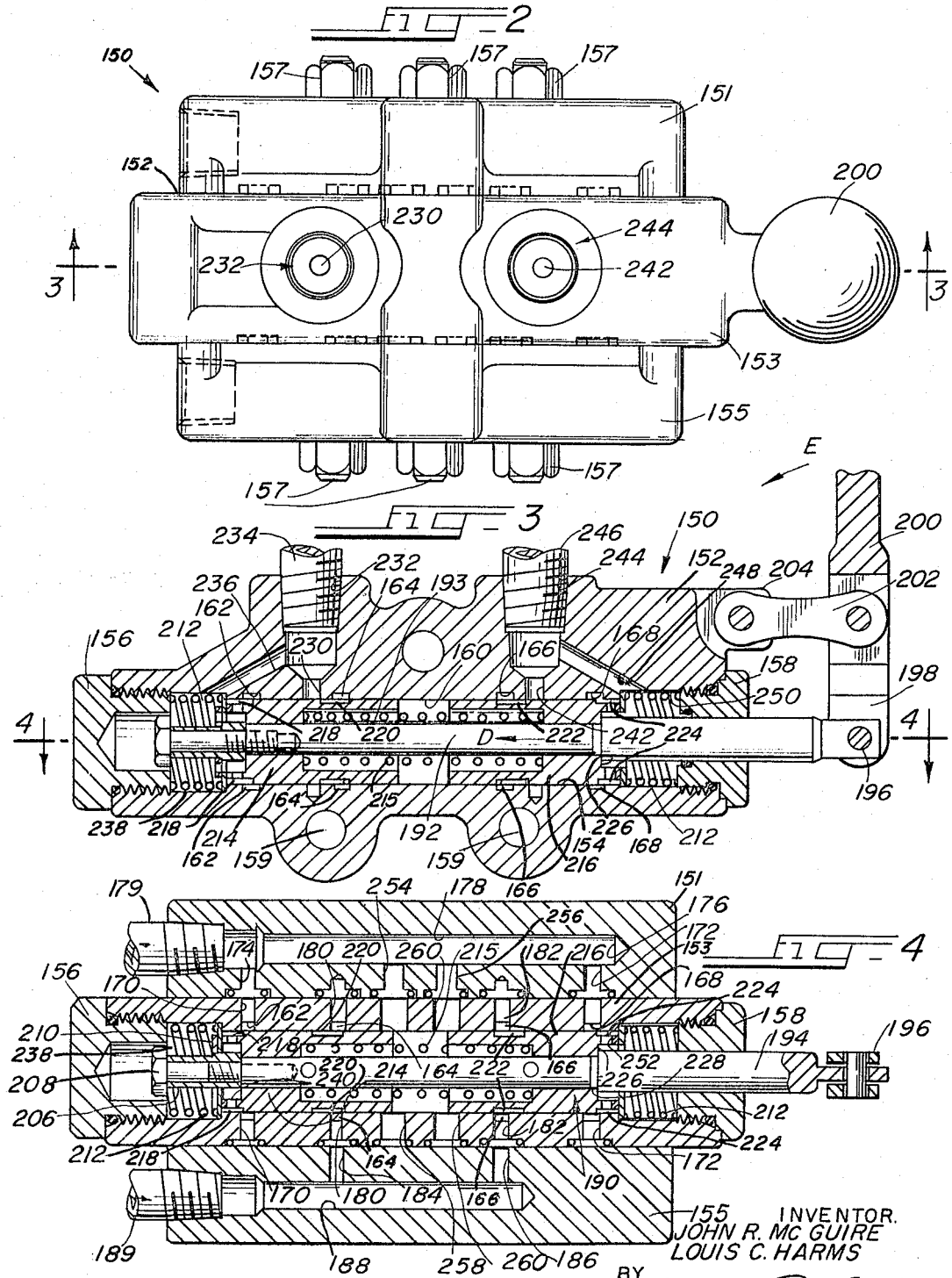

3,310,068
FLOW REGULATOR VALVES AND HYDRAULIC SYSTEMS

John R. McGuire, Northfield, and Louis C. Harms, Evanston, Ill., assignors to Fluid Power Accessories, Inc., Glenview, Ill., a corporation of Illinois
Filed Oct. 5, 1964, Ser. No. 403,442
8 Claims. (Cl. 137—625.69)

The present invention relates to hydraulic systems and more particularly to novel and improved remote control hydraulic systems and a novel flow regulator valve therefor.

The hydraulic system of the present invention is particularly adapted for use in remotely controlling hydraulic equipment used in raising and lowering loads; such as, for raising and lowering booms, and the like on utility trucks, repair trucks, fire apparatus, or similar mobile equipment. By means of the present improved hydraulic system and novel flow regulator valve, precise directional control of such equipment is achieved. Thus, smooth raising and lowering of loads is accomplished with the load under control at all times. Likewise, the hydraulic system of the present invention is compact, and inexpensive yet highly effective and efficient in controlling the hydraulic lifting members of the associated hydraulic equipment.

In addition, the novel flow regulator valve of the present invention permits highly sensitive pilot pressure for controlling the larger valves in the improved hydraulic system. Such flow regulator valve is characterized by the provision of means for banking a plurality of such valves together to permit selective individual or simultaneous operation of the valve actuating levers. Further, the novel flow regulator valve assembly of the present invention is constructed and arranged to be mounted in operative association with the directional control valves of pre-existing hydraulic system, thereby adapting such systems for precise control valve actuation. This, in turn, permits accurate load control of the hydraulic lifting members operated by such systems.

Another unique feature of the flow regulator control valve of the present invention is the provision, in the event of malfunction of the flow regulator control valve, of means for manual actuation thereof. Thus, if the pressure to the flow regulator control valve fails or it is decided to override the pilot pressure signal from the flow regulator control valve to the directional control valve, a manually-operated control member is actuated by the operator to position the direction control valve spool at the desired position, overriding any signal thereto from the flow regulator control valve.

It is therefore an object of the present invention to provide an improved hydraulic system for effectively controlling an hydraulic lifting member.

Another object of the invention is to provide, in an improved hydraulic system, a novel flow regulator control valve for precisely controlling actuation of an associated control valve.

Another object of the invention is to provide a novel flow control regulator valve constructed and arranged to be banked in groups and adapted for selective individual or simultaneous operation of the valve actuating levers.

A further object of the present invention is the provision of means, in an improved hydraulic system, for the manual operation of a control valve in the system in the event of pilot valve malfunction.

It is also an object of the present invention to provide a novel flow regulator control valve constructed and arranged to be mounted in operative association with a control valve of a pre-existing hydraulic system.

Further objects and advantages of the invention will be obvious herefrom or may be learned by practice with the invention, the same being realized and attained by means of the instrumentalities and combinations pointed out in the appended claims.

The foregoing general description and the following detailed description are exemplary and explanatory, but are not restrictive of the invention.

Of the drawings illustrating by way of example preferred embodiments of the invention and wherein like numerals designate like parts:

FIG. 1 is a partially schematic view of a hydraulic system embodying the principles of the present invention;

FIG. 2 is a plan view of the novel flow regulator control valve of the present invention;

FIG. 3 is a sectional side elevation taken along lines 3—3, FIG. 2;

FIG. 4 is a sectional plan view taken along lines 4—4, FIG. 3;

Figure 5:
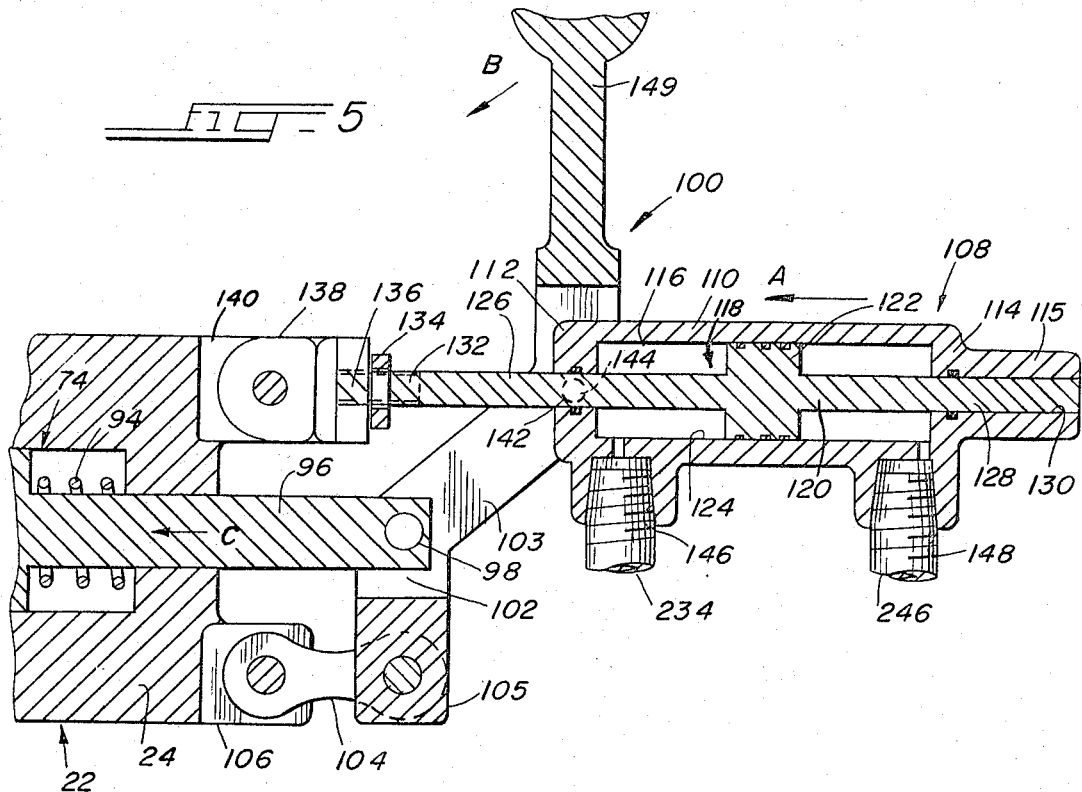
FIG. 5 is a sectional view illustrating the manual override mechanism of the present invention.

Turning to the drawings and particularly to FIG. 1, there is illustrated an hydraulic system designated generally 10, embodying the principles of the present invention.

System 10 includes a main hydraulic drive unit 12 for controlling the movement of an associated work load (not shown). Drive unit 12 comprises a cylinder 14 having a reciprocating piston 16 suitably mounted therein. The piston connecting rod 18 extends externally of cylinder 14 and is suitably attached directly or by suitable mechanisms to the work load (not shown) for moving the latter in response to actuation of drive unit 12.

System 10 also includes a directional control valve 20 for controlling the actuation of drive unit 12. Valve 20 includes an outer, generally cylindrical housing 22 provided with a pair of end walls 24 and 26, which enclose the interior of housing 22 to form a closed chamber 28 therein. The inner surface 30 of housing 22 includes a plurality of axially spaced annular grooves or recesses 32, 34, 36, 38 and 40 formed therein. Grooves 34 and 38 communicate with ports 42 and 44, respectively in the cylindrical wall 46 of housing 22. Port 42 in turn is connected by conduit 48 to one side of main valve cylinder 14 while port 44 is connected by conduit 50 to the other side of cylinder 14 so that hydraulic fluid, moving through conduits 48 and 50 from and to ports 42 and 44, suitably actuates main drive unit 12.

Groove 36, communicates with directional valve inlet port 52 to admit hydraulic fluid under pressure to valve 20 from conduit 54. Conduit 54, in turn, is connected to the outlet side of a pump 56 in system 10, with the inlet side of pump 56 connected by conduit 58 to suitable source of hydraulic fluid; such as, reservoir or tank 60.

Outermost grooves 32 and 40, in like manner, communicate with outlet ports 62 and 64 in wall 46 which are in turn connected to conduits 66 and 68 respectively which conduct fluid therein into a common return conduit 70, past a suitable back pressure check valve 72 and thence to reservoir 60.

The control of fluid through ports 42, 44, 52, 62 and 64 of valve 20 is accomplished by means of a spool member 74 slidably mounted within chamber 28. Spool 74 includes an elongated cylindrical body section 73 and a pair of spaced end lands 76 and 78 enclose the interior of body section 73 to form bore 75 therein. Spool 74 also is formed with an intermediate land 80 on body section 73 approximately mid-way between lands 76 and 78. Lands 76, 78 and 80 are dimensioned to be in intimate freely slidable contact with the inner face 30 of wall 46, preventing leakage of hydraulic fluid therepast yet permitting free movement of spool 74 in chamber 28.

Lands 76, 78 and 80 are each formed with an annular recess 82, 84 and 86 respectively therein communicating with bore 75 of spool 74.

With spool 74 in the neutral position as shown in FIG. 1, recess 86 is aligned with groove 36 and inlet port 52 in cylinder 22 to admit hydraulic fluid under pressure into bore 75. In like manner, recesses 82 and 84 are aligned respectively with recesses 32 and 40 and their associated outlet ports 62 and 64 to return the hydraulic fluid entering bore 75 back to reservoir 60.

As will be noted from FIG. 1, the body portion 73 of spool 74 is of a smaller diameter than chamber 28 of cylinder 22. Thus, an annular recess 88 is formed by inner surface 30 of cylinder 22 and the outer periphery of body section 73 of spool 74 between lands 76 and 80. In like manner, a second annular recess 90 is formed between lands 80 and 78 with recess 88 aligned with recess 34 and port 42 and recess 90 aligned with recess 38 and port 44 when spool 74 is in neutral position as shown in FIG. 1.

A pair of spaced centering springs 92 and 94 each bearing against an associated end land 76 or 78 on spool 74 normally maintain spool 74 in the neutral position shown.

To move spool 74 back and forth in chamber 28 to suitably actuate main drive unit 12, there is provided a directional control valve actuating rod 96 secured at one end to land 76 and extending externally of cylinder 22 through end wall 24.

As shown best in FIG. 5, the other end of rod 96 is pinned as at 98 to bifurcated bell crank lever 100 with pin 98 positioned in an accommodating slot 102 (only one shown) in the spaced arms 103 (only one shown) of lever 100 thereby providing a degree of lost-motion between rod 96 and lever 100.

At lowermost end 105 of lever 100, arms 103 are joined in common and pinned by links 104 to a lower abutment 106 on end wall 24 of cylinder 22.

To actuate lever 100, and thereby move rod 96, there is provided an actuator unit 108 comprising a generally cylindrical motor housing 110 closed at each end by end walls 112 and 114 to form a suitable valve chamber 116 therein. As will be seen in FIG. 5, end wall 114 has formed thereon an extension 115 for reasons hereinbelow set forth.

Reciprocally mounted within chamber 116 is a piston 118 having a piston rod 120 with a head 122 mounted thereon adjacent the middle of the rod 120. Head 122 is in intimate freely sliding engagement with the inner surface 124 of cylinder 110 with one end 126 of rod 120 projecting outwardly of chamber 116 through wall 112 while the other end 128 of rod 120 is slidably disposed in an accommodating opening 130 in extension 115.

Terminus 132 of rod 120 is secured as by collar 134 to a stud bolt 136 carried by clevis 138 pivotally connected to an upper abutment unit 180 on end wall 24 of cylinder 22.

Actuator unit 108 is connected to lever 100 by means of stud pins 142, one of which is carried by each arm 103 of lever 100, inserted in an accommodating recess 144 in end wall 112.

In operation, when hydraulic fluid under pressure enters chamber 116 through port 146 in housing 110, a force is exerted thereby against head 122 on rod 120. However since rod 120 is fixed at 132, this force causes housing 110 to move along rod 120 in the direction of arrow A, FIG. 5. In like manner, when fluid enters chamber 116 through port 148, housing 110 is caused to travel along rod 120 in a direction opposite to arrow A, FIG. 5.

In turn, as housing 110 thus is moved along rod 120 in the direction of arrow A, FIG. 5, lever 100, by means of the connection thereto by pins 142, is caused to pivot in the direction of arrow B, FIG. 5, thereby moving spool 74 in the direction of arrow C, FIG. 5. Likewise, movement of housing 110 in the opposite direction reverses the direction of movement of lever 100 and spool 74.

In the event of malfunction or other improper actuation of actuator unit 108, lever 100 is provided with an actuating handle 149 which can be employed to manually pivot lever 100 in the desired direction to move spool 74 to a selected position in chamber 28.

To control the fluid entering ports 146 and 148 in actuator unit 108, system 10 includes a novel pilot valve 150. Valve 150 includes a valve housing 152 having formed therethrough a generally-cylindrical bore 154 which is closed at each end by a pair of end caps 156 and 158. Housing 152 is formed preferably of three sections 151, 153 and 155 suitably interconnected by fastening means such as bolts 157 accommodated in bolt holes 159. The surface 160 defining bore 154 includes a plurality of spaced annular grooves or recesses 162, 164, 166 and 168 formed therein (see FIGS. 3 and 4).

Grooves 162 and 168 each communicate with an associated channel 170 and 172 respectively in body section 153 which in turn are aligned with associated exit ports 174 and 176 in body section 151. Ports 174 and 176 are, in like manner, in communication with tank port 178 in body section 151 to conduct fluid passing therethrough into port 178 and hence via conduit 179 to tank or reservoir 60 in system 10.

Grooves 164 and 166, in turn, each communicate with an associated channel 180 and 182 in body section 153 which are aligned with associated entry ports 184 and 186 in body section 155. Ports 184 and 186 are in communication with fluid entry port 188 in body section 155 to admit hydraulic fluid under pressure, entering therein via conduit 189, into valve 150.

For controlling the passage of fluid through valve 150, bore 154 accommodates a control unit, designated generally 190, which comprises a control rod 192 connected at one end to one end of an elongated actuator element 194 which projects through end cap 158. Actuator element 194 is pinned as at 196 to the lowermost bifurcated end 198 of an operating arm 200. Arm 200, in turn, is pivotally mounted by links 202 to an abutment 204 on housing 152. The end of rod 192 remote from actuator 194 is provided with an extention 206 attached to rod 192 by bolt 208 and having secured thereabout a stop element 210.

A pair of spaced, opposed centering springs 212 operate to normally maintain rod 192 in neutral position shown in FIGS. 3 and 4.

To control the passage of fluid through valve 150, rod 192 is provided with a pair of freely movable sleeve-like piston members 214 and 216 slidably mounted on the outer peripheral surface 193 of rod 192. Piston 214 in turn is provided with a pair of axially spaced annular grooves or recesses 218 and 220 while piston 216 has formed therein spaced annular grooves or recesses 222 and 224.

Encircling rod 192 and disposed between valves 214 and 216 with one end bearing against each is a pressure regulating spring 215. With rod 192 in neutral position, spring 215 is operative to assist in disposing valves 214 and 216 substantially as shown in FIGS. 3 and 4.

In the neutral position shown in FIGS. 3 and 4, grooves 220 and 222 of valves 214 and 216 respectively are aligned with channels 180 and 182 and entry ports 184 and 186 respectively to admit hydraulic fluid under pressure thereinto from their associated grooves 164 and 166. However, further passage of fluid through valve 150 from grooves 220 and 222 is prevented since grooves 220 and 222, with the control rod 192 of valve 150 in neutral position, are substantially blocked.

When during the operation of the pilot valve 150, lever 200 is suitably actuated to travel rod 192 in the direction of arrow D, FIG. 3, the end face 226 of valve 216 is engaged by a shoulder 228 on actuator 194, thereby urging valve 216 in the direction of arrow D a distance corresponding to the travel of actuator 194 and rod 192.

This movement of valve 216 moves groove 222 out of alignment with fluid entry channel 182 interrupting the flow of fluid through groove 222. However, as valve 216 is moved in the direction of arrow D by actuator 194, spring 215 is compressed, thereby resiliently urging valve 214 in the direction of arrow D also. As valve 214 travels in the direction of arrow D groove 220 thereof it comes into communication with a bore 230 in housing 152 in turn in communication with an exit port 232. Port 232 is connected by conduit 234 to port 146 of actuator unit 108. Thus, hydraulic fluid under pressure passes from groove 220 through bore 230, port 232 and conduit 234 into port 146 and chamber 116 of actuator unit 108 to suitably actuate such unit.

It will be understood that the pressure of the fluid exiting from port 234 increases as spring 215 is compressed and valve 214 thereby urged along rod 192 in the direction of arrow D. The greater the compression of spring 215, the greater the pressure of the hydraulic fluid exiting at port 234.

To relieve excess pressure port 232 is provided with a by-pass channel 236 communicating port 234 with an annular chamber 238 in section 153 adjacent the end of rod 192 remote from actuator 194. As fluid under pressure enters port 232 a portion thereof by-passes into channel 236 and chamber 238. Thus, as the hydraulic fluid exiting through port 234 increases in pressure as valve 214 is travelled in the direction of arrow D, the hydraulic fluid in chamber 238 also increases in pressure a like amount. In the event the pressure of the fluid exceeds a selected degree, the pressure of the fluid in chamber 238 overcomes the force of spring 215 causing piston 214 to move in the direction opposite to arrow D. This vents port 234 to tank or reservoir 60 through bore 240 in the end of valve 214, annular groove 218 communicating with bore 240, recess 162, channel 170, port 174, tank port 178 and conduit 179. Thus, the effective spring force of spring 215 regulates the maximum pilot pressure available.

In like manner, when arm 200 is suitably actuated to move rod 192 in the direction opposite to arrow D, groove 220 of valve 214 moves out of communication with bore 230 interrupting the flow of hydraulic fluid to port 232.

However, such movement of rod 192 effects communication of groove 222 of valve 216 with a bore 242 in housing 152 which is in turn in communication with an exit port 44. Port 244 is connected by conduit 246 to port 148 of actuator unit 108. Thus hydraulic fluid under pressure passes from groove 222 through bore 242, port 244 and conduit 246 into port 148 and chamber 116 of actuator unit 108 to suitably actuate such unit.

Port 244 is likewise provided with a by-pass channel 248 in communication with a second annular chamber 250 in section 153 adjacent actuator 194 which operates through bore 252, groove 224, recess 168, channel 172, port 176 to tank port 178 and conduit 179.

It will be understood that when valve 216 moves in the direction of arrow D as heretobefore described, port 244 is vented to reservoir 60 through by-pass channel 248, chamber 250, bore 252, groove 224, recess 168, channel 172 and port 176. In like manner, when valve 214 moves in the direction opposite to arrow D as heretofore described, port 232 is vented to reservoir 60 through its associated by-pass channel 236, chamber 238, bore 240, groove 218, recess 162, channel 170 and port 174.

For reasons hereinbelow set forth, body section 151 is provided with a pair of spaced bores 254 and 256 which interconnect tank port 178 and closed bore 154 through channels 258 and 260 aligned respectively therewith. Preferably channels 258 and 260 are disposed between annular grooves 164 and 166 and are in communication with bore 154 between valves 214 and 216 when such valves are in neutral position as shown in FIG. 4.

To admit hydraulic fluid under pressure to pilot valve 150, inlet conduit 189 is connected to the outlet end of a suitable pressure control member 262; such as, a pressure reducing valve or pressure-compensated flow regulator. The inlet end of pressure control member 262 is connected by suitable conduit 264 to conduit 54. Another conduit 266 having a one-way pressure limiting valve 268 therein is connected between conduit 189 and reservoir 60. Valve 268 operates as a safety check and is constructed to open thereby permitting flow from conduit 189 to reservoir 60 when the pressure in conduit 189 exceeds a selected pressure. A system relief valve 270 is mounted in conduit 272 connected to conduit 54 and is adapted to open when pressure in conduit 54 exceeds a selected pressure for venting the entire system 10 to reservoir 60.

To ensure positive operation of valves 214 and 216, there is provided in conduit 179 a back-pressure check valve 274 which maintains some back pressure within pilot valve 150 tending to cushion the movement of valves or piston members 214 and 216 along rod 192 thereby providing smooth valve motion and accurate pilot valve control.

In operation, pump 56 is actuated to admit hydraulic fluid under pressure to directional control valve 20 and simultaneously to pilot valve 150 through pressure control member 262. The operator at his remote location in the cab of the truck or other apparatus provided with system 10 moves the operating arm 200 of pilot valve 150 mounted in the cab to suitable position to shift rod 192 and piston members 214 and 216 appropriately to actuate directional control valve as desired.

When, as for example, arm 200 is rotated in the direction of arrow E, FIG. 3, fluid under pressure is admitted to bore 242 and port 244 into conduit 246 from whence it is connected to port 148 in actuator unit 108. Fluid entering unit 108 through port 148, housing 110 is caused to travel along rod 120 in a direction opposite to arrow A, FIG. 5. This movement of housing 110 causes directional control valve spool 74 to move in a direction opposite to arrow C, FIG. 5.

When spool 74 is thus moved in chamber 28, grooves 82 and 84 thereof move out of alignment with annular recesses 32 and 40 and outlet ports 62 and 64 respectively. However, such movement of spool 74 communicates inlet port 52 and groove 36 with a portion of annular recess 90 another portion of which remains, in turn, in communication with recess 38. Thus, hydraulic fluid under pressure enters valve 20 through port 52 and, passing through grooves 36, 90 and 38 exits through port 44 into conduit 50 and hence to main drive unit 12 where such fluid is operative to retract piston 18.

In like manner, when the operator moves arm 200 in a direction opposite to arrow E, FIG. 3, spool 74 is advanced in the direction of arrow C, FIG. 5 to effect extension of piston rod 18 through admission of hydraulic fluid under pressure from conduit 54 through communicating port 52, grooves 36, 88, 34 and port 42 into conduit 48.

Figure 6:
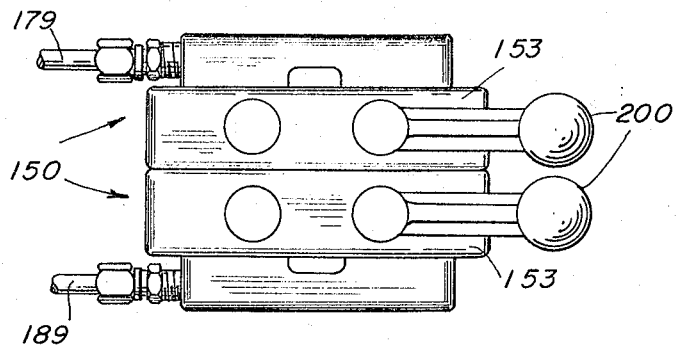
FIG. 6 is a plan view illustrating a plurality of flow regulator control valves in banked arrangement.

If desired, a plurality of pilot valves 150 can be banked together as shown in FIG. 6 with a single fluid inlet conduit 189 and tank conduit 179 serving all banked valves 150. In such arrangement the body sections 153 of adjacent valves 150 are contiguous such that the channels 170, 180, 258, 260, 182 and 172 in each section 153 are in alignment to permit proper passage of fluid through all banked valves 150 in accordance with the selected positions of the operating arms 200. Arms 200 are aligned in position to permit the operator to move one or all of the arms 200 to selected positions to thereby selectively actuate any one or all of the valves 150 and their associated mechanisms.

It will be understood that valve 150 by reason of its unique construction and utilization of slidable, spring-controlled, valves 214 and 216 and by-pass vent features provides precise accurate pilot pressure control for its associated directional control valve 20 and system 10.

In like manner, it will be understood that pre-existing hydraulic system employing conventional control valves can be readily adapted to employ the novel flow regulator system of the invention. Pre-existing control valves can be readily provided with external actuator unit 108 by affixing to the control valve spool lever 100, valve housing 110 and their associated elements. With the conventional control valve thus provided with lever 100 and unit 108, a pilot valve 150 may be suitably connected thereto as described hereinabove to provide precise remote control thereof.

Thus, there is disclosed a novel and improved hydraulic system for the remote control of associated hydraulically actuated equipment which system is simple, compact and inexpensive yet highly efficient in accurately controlling such equipment. Likewise, there is disclosed a novel flow regulator valve for precise remote control of the larger main valves of the system.

We claim:

1. A self regulating hydraulic valve arrangement comprising fluid conduit means extending between an input opening and an output opening, a first valve element, means mounting said first valve element for movement to control the flow of fluid through said conduit means by varying its cross section at a given location therealong, a bypass conduit extending from said conduit means at a location between said given location and said output opening, a second valve element interposed along said bypass conduit to control fluid flow therethrough, a valve actuator arranged to control movements of said first valve element and resilient means interposed between said valve actuator and said second valve element, said resilient means and said second valve element being arranged such that movement of said valve actuator in a direction corresponding to increasing flow through said conduit means, correspondingly imposes an increased resilient bias urging said second valve element to a conduit closing position.

2. A valve arrangement as in claim 1 wherein said conduit means and said bypass conduit are formed in a common housing and include, respectively, different portions of a common bore therein, wherein said first and second valve elements are mounted on a common spool structure movable along inside said bore, and wherein said resilient means comprises a compression spring interposed between said valve actuator and said common spool structure.

3. An hydraulic valve for controlling passage of hydraulic fluid from a source of working fluid under pressure to an associated remotely-located hydraulically-actuatable control member comprising a valve housing, inlet means in said housing for admitting fluid under pressure into said housing, outlet means in said housing for venting fluid from said valve, a pair of ports in said housing, conduit means for connecting said ports to said associated control member, said housing being formed with a chamber therein, said chamber being formed with a plurality of annular recesses communicating respectively with said fluid inlet means, with said oulet means, and with each of said ports a control element movably mounted within said chamber, a pair of opposed valve elements each operatively associated with a different one of said ports, said valve elements being formed with external grooves of sufficient axial extent to bridge and thus hydraulically connect its associated port communicating recesses with one of said other recesses, actuator means connected to said control member and valve elements for moving said members and elements to selected positions in said chamber thereby to bring a selected groove in one of said valve elements into bridging alignment with a port communicating and an inlet means communicating recess in said housing for actuating said control member in a predetermined manner, while simultaneously bringing a selected groove in the other of said valve elements into bridging alignment with a different port communicating and an outlet communicating recess in said housing.

4. The valve of claim 3 including means in said outlet means for maintaining a predetermined minimum back pressure in said valve.

5. An hydraulic valve for controlling passage of hydraulic fluid from a source of working fluid under pressure to an associated remotely-located hydraulically-actuatable control member comprising a valve housing, inlet means in said housing for admitting fluid under pressure into said housing, outlet means in said housing for venting fluid from said valve, a pair of ports in said housing, conduit means for connecting said ports to said associated control member, said housing being formed with a chamber therein, a plurality of annular recesses communicating respectively with said fluid inlet means and with said outlet means and with each of said ports, a control rod movably mounted within said chamber, a pair of opposed valve elements freely mounted on said rod, pressure regulating spring means normally biasing said valve elements away from each other, each of said valve elements being operatively associated with a different one of said ports, each of said valve elements being formed with external grooves of sufficient axial extent to bridge and thereby hydraulically interconnect one of said port communicating recesses with one of said other recesses, means for moving said rod in said chamber, means on said rod for engaging one of said valve elements as said rod is moved in a given direction in said chamber for disposing said engaged valve element at a selected position in said chamber, said spring means being operative to move the other of said valve elements to a corresponding position in said chamber in response to the movement of said engaged valve element, whereby selected grooves in one of said valve elements is aligned with associated recesses in said housing to hydraulically interconnect said inlet means and a selected one of said ports for actuating said control member in a predetermined manner, while simultaneously aligning selected grooves in the other of said valve elements with associated recesses in said housing for hydraulically-interconnecting said other port and said outlet means.

6. The valve of claim 5 including means in said outlet means for maintaining a predetermined minimum back pressure in said valve.

7. The valve as defined in claim 5 where in said engaged valve element connects its associated port to said outlet means.

8. The valve as defined in claim 7 including a by-pass channel in said housing communicating with each of said ports, an annular zone at each end of said control rod in communication with one of said by-pass channels, vent means at each end of said rod adjacent one of said housing recesses associated with said outlet means, said vent means being in communication with an associated zone whereby a portion of said fluid under pressure exiting through the port of said unengaged valve element is by-passed through said associated by-pass channel into its associated annular zone such that, a fluid pressure greater than a selected ffuid pressure as determined by said spring means is operative to move said unengaged valve element along said rod in opposition to said spring to thereby vent fluid from said associated port through said by-pass, zone, vent means, and recess to said outlet means.

References Cited by the Examiner

UNITED STATES PATENTS

| | | | |
|---|---|---|---|
| 2,630,135 | 3/1953 | Johnson | 137—625.68 |
| 2,954,051 | 9/1960 | Krehbiel | 137—596.13 |
| 3,078,873 | 2/1963 | Stockett | 137—625.67 |
| 3,220,318 | 11/1965 | McGuire | 91—461 |

M. CAREY NELSON, *Primary Examiner.*

HENRY T. KLINKSIEK, *Examiner.*